(12) United States Patent
Bhutani et al.

(10) Patent No.: US 10,585,986 B1
(45) Date of Patent: Mar. 10, 2020

(54) ENTITY STRUCTURED REPRESENTATION AND VARIANT GENERATION

(71) Applicant: International Business Machines Corporation, Armonk, NY (US)

(72) Inventors: Nikita Bhutani, San Jose, CA (US); Mauricio Hernandez-Sherrington, San Jose, CA (US); Yunyao Li, San Jose, CA (US); Min Li, San Jose, CA (US); Kun Qian, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/105,714

(22) Filed: Aug. 20, 2018

(51) Int. Cl.
*G06F 17/27* (2006.01)
*G06F 16/35* (2019.01)

(52) U.S. Cl.
CPC ............ *G06F 17/278* (2013.01); *G06F 16/35* (2019.01); *G06F 17/2705* (2013.01); *G06F 17/2785* (2013.01)

(58) Field of Classification Search
None
See application file for complete search history.

(56) References Cited

U.S. PATENT DOCUMENTS

| | | | |
|---|---|---|---|
| 8,611,505 | B2 | 12/2013 | Oppenheim et al. |
| 8,949,241 | B2 | 2/2015 | Olof-Ors et al. |
| 9,063,926 | B2 | 6/2015 | Crestani Campos et al. |
| 9,189,473 | B2 | 11/2015 | Galle et al. |
| 9,652,452 | B2 * | 5/2017 | Iverson .................. G06F 17/28 |
| 10,169,331 | B2 * | 1/2019 | Baron-Palucka ... G06F 17/2785 |
| 10,303,771 | B1 * | 5/2019 | Jezewski ................ G06F 16/30 |
| 2003/0191625 | A1 | 10/2003 | Gorin et al. |
| 2013/0317806 | A1 | 11/2013 | Crestani Campos et al. |
| 2016/0012020 | A1 | 1/2016 | George et al. |

(Continued)

FOREIGN PATENT DOCUMENTS

GB    2536898 A    10/2016

OTHER PUBLICATIONS

Nadeau, David, "Semi-Supervised Named Entity Recognition: Learning to Recognize 100 Entity Types with Little Supervision," Thesis, University of Ottawa, 2007.

(Continued)

*Primary Examiner* — Satwant K Singh
(74) *Attorney, Agent, or Firm* — Ryan, Mason & Lewis, LLP

(57) ABSTRACT

Methods, systems, and computer program products for entity structured representation and variant generation are provided herein. A computer-implemented method includes automatically parsing instances of a given entity type into semantic components by implementing a parser based at least in part on (i) the given entity type and (ii) items of information relevant to the given entity type; generating, based at least in part on (i) the semantic components and (ii) information pertaining to one or more valid component-specific variants, one or more variants of the semantic components; creating, based at least in part on the one or more variants of the one or more semantic components, one or more variants of at least one instance of an entity associated with the given entity type; and outputting, to at least one user, the one or more variants of the at least one instance of the entity.

16 Claims, 11 Drawing Sheets

(56) References Cited

U.S. PATENT DOCUMENTS

| | | | |
|---|---|---|---|
| 2018/0011837 | A1 | 1/2018 | Beller et al. |
| 2018/0121500 | A1* | 5/2018 | Reschke ............. G06F 17/2785 |
| 2018/0314729 | A9* | 11/2018 | Reschke ............. G06F 17/2785 |
| 2019/0251172 | A1* | 8/2019 | Jezewski ............. G06F 17/277 |

OTHER PUBLICATIONS

Thompson et al., "The BioLexicon: A Large-Scale Terminological Resource for Biomedical Text Mining," BMC Bioinformatics 12.1 (2011):397.
Arasu et al., 2009. A grammar-based entity representation framework for data cleaning. In Proceedings of the 2009 ACM SIGMOD International Conference on Management of data, pp. 233-244. ACM.
Arasu et al., 2008. Transformation-based framework for record matching. In Data Engineering, 2008. ICDE 2008. IEEE 24th International Conference on, pp. 40-49. IEEE.
Arasu et al., 2009. Learning string transformations from examples. Proceedings of the VLDB Endowment, 2:514-525.
Auer et al., 2007. Dbpedia: A nucleus for a web of open data. In the semantic web, pp. 722-735. Springer.
Bartoli et al., 2012. Automatic generation of regular expressions from examples with genetic programming. In Proceedings of the 14th annual conference companion on Genetic and evolutionary computation, pp. 1477-1478. ACM.
Berant et al., 2013. Semantic parsing on freebase from question-answer pairs. In EMNLP, vol. 2, p. 6.
Steven Bethard. 2013. A synchronous context free grammar for time normalization. In EMNLP, pp. 821-826.
Bollacker et al., 2008. Freebase: a collaboratively created graph database for structuring human knowledge. In Proceedings of the 2008 ACM SIGMOD international conference on Management of data, pp. 1247-1250. ACM.
Carlson et al., 2010. Toward an architecture for never-ending language learning. In AAAI, vol. 5, p. 3.
Peter Christen. 2012. A survey of indexing techniques for scalable record linkage and deduplication. IEEE transactions on knowledge and data engineering, 24(9):1537-1555.
Culotta et al., 2005. Reducing labeling effort for structured prediction tasks. In AAAI, vol. 5, pp. 746-751.
Dredze et al., 2010. Entity disambiguation for knowledge base population. In COLING.
D'Souza et al., 2015. Sieve-based entity linking for the biomedical domain. In ACL (2), pp. 297-302.
Elmagarmid et al., 2007. Duplicate record detection: A survey. IEEE Transactions on knowledge and data engineering, 19(1):1-16.
Fader et al., 2011. Identifying relations for open information extraction. In Proceedings of the Conference on Empirical Methods in Natural Language Processing, pp. 1535-1545. Association for Computational Linguistics.
Finkel et al., 2009. Nested named entity recognition. In Proceedings of the 2009 Conference on Empirical Methods in Natural Language Processing: vol. 1—vol. 1, pp. 141-150. Association for Computational Linguistics.
Galarraga et al., 2014. Canonicalizing open knowledgebases. In Proceedings of the 23rd ACM International Conference on Conference on Information and Knowledge Management, pp. 1679-1688. ACM.
Halevy et al., 2016. Discovering structure in the universe of attribute names. In Proceedings of the 25th International Conference on World Wide Web, pp. 939-949. International World Wide Web Conferences Steering Committee.
Han et al., 2011. Collective entity linking in web text: a graph-based method. In Proceedings of the 34th international ACM SIGIR conference on Research and development in Information Retrieval, pp. 765-774. ACM.

Hoffmann et al., 2011. Knowledge-based weak supervision for information extraction of overlapping relations. In Proceedings of the 49th Annual Meeting of the Association for Computational Linguistics: Human Language Technologies—vol. 1, pp. 541-550. Association for Computational Linguistics.
Lee et al., 2014. Context-dependent semantic parsing for time expressions. In ACL (1), pp. 1437-1447.
Lehmann et al., 2010. Lcc approaches to knowledgebase population at tac 2010. In TAC.
Li et al., 2008. Regular expression learning for information extraction. In Proceedings of the Conference on Empirical Methods in Natural Language Processing, pp. 21-30. Association for Computational Linguistics.
Xiao Li. 2010. Understanding the semantic structure of noun phrase queries. In Proceedings of the 48th Annual Meeting of the Association for Computational Linguistics, pp. 1337-1345. Association for Computational Linguistics.
Liu et al., 2013. Entity linking for tweets. In ACL (1), pp. 1304-1311.
McCallum et al., 2000. Efficient clustering of high-dimensional data sets with application to reference matching. In Proceedings of the sixth ACM SIGKDD international conference on Knowledge discovery and data mining, pp. 169-178. ACM.
Nakashole et al., 2011. Scalable knowledge harvesting with high precision and high recall. In Proceedings of the fourth ACM international conference on Web search and data mining, pp. 227-236. ACM.
Qian et al., 2017. Active learning for large-scale entity resolution. In Proceedings of the 2017 ACM on Conference on Information and Knowledge Management, CIKM '17, pp. 1379-1388, New York, NY, USA. ACM.
Qian et al., 2018. Lustre: An interactive system for entity structured representation and variant generation. In Data Engineering (ICDE), 2018 IEEE 34th International Conference on. IEEE.
Riedel et al., 2010. Modeling relations and their mentions without labeled text. In Joint European Conference on Machine Learning and Knowledge Discovery in Databases, pp. 148-163. Springer.
Settles et al., 2008. An analysis of active learning strategies for sequence labeling tasks. In Proceedings of the conference on empirical methods in natural language processing, pp. 1070-1079. Association for Computational Linguistics.
Shen et al., 2015. Entity linking with a knowledge base: Issues, techniques, and solutions. IEEE Transactions on Knowledge and Data Engineering, 27(2):443-460.
Singh et al., 2012. Learning semantic string transformations from examples. Proceedings of the VLDB Endowment, 5:740-751.
ACE 2005 multilingual training corpus. Linguistic Data Consortium, Philadelphia, 2006.
Xu et al., 2013. Filling knowledge base gaps for distant supervision of relation extraction. In ACL (2), pp. 665-670.
Zhang et al., 2010. Nus-i2r: Learning a combined system for entity linking. In TAC.
Zheng et al., 2010. Learning to link entities with knowledgebase. In Human Language Technologies: The 2010 Annual Conference of the North American Chapter of the Association for Computational Linguistics, pp. 483-491. Association for Computational Linguistics.
SAP, SAP HANA Variant Generation, https://help.sap.com/viewer/650b1af302924b3d85ec109e325edf93/2.0.00/en-US/57b1fcc36d6d1014b3fc9283b0e91070.html, 2017.
Johannes Hoffart, Fabian M Suchanek, Klaus Berberich, and Gerhard Weikum. 2013. YAGO2: A spatially and temporally enhanced knowledge base from Wikipedia. Artificial Intelligence 194 (2013), 28-61.
David D Lewis and Jason Catlett. 1994. Heterogeneous uncertainty sampling for supervised learning. In Machine Learning Proceedings 1994. Elsevier, 148-156.

* cited by examiner

Algorithm 1 LUSTRE Learning algorithm input: $\mathcal{U}_\in$ = a pool of unlabeled mentions $\{m\}$
output: $M_\in$ = a model of mapping rules $\{r_S\}$ 1: function TRAIN($\mathcal{U}_\in$)
2:    $L_\in$ = a set of labeled mentions $\{\langle m, l\rangle\}$
3:    $F$ = feedback $\{\langle m, l, f\rangle \mid m \in \mathcal{U}, f \in \{0, 1\}\}$
4:    $M = \varnothing$
5:    for $t = 1, 2 \ldots$ do
6:      $M =$ UPDATE($M, L, F$)
7:      select $m^* \in \mathcal{U}$, mention with highest utility
8:      select $F$ with least confident predictions
9:      query label $l^*$ for mention $m^*$
10:     query binary feedback on $F$
11:     $L = L \cup \langle m^*, l^*\rangle$, $\mathcal{U} = \mathcal{U} \setminus \{m^*\}$
12:     return $M$
13: function UPDATE($M, L, F$)
14:    for $\langle m, l\rangle \in L$ do
15:      $r_S = generate\_rule(l)$
16:      if $r_S \notin M$ then
17:        $P_{r_S} = reliability(r_S)$
18:        $M = M \cup \langle r_S, P_{r_S}\rangle$
19:    for $\langle r_S, P_{r_S}\rangle \in M$ do
20:      $P_{r_S} = estimate(P_{r_S}, F)$
21:    return $M$

FIG. 2

$$c_i = \frac{1}{|U|} \sum_{j \in U} c(i,j)$$

$$c(i,j) = 1 - \frac{\text{edit distance}(S_i, S_j)}{\text{max edit distance}}$$

300

$$f_i = \begin{cases} 1 & \text{if no rule maps } m_i \\ 1 - P_{r_S} & \text{otherwise} \end{cases}$$

$$P_{r_S} = \operatorname*{argmax}_r P_{r_S}$$

302

$$u_i = c_i * f_i$$
$$m^* = \operatorname*{argmax}_{m_i} u_i$$

$$sel(p_i) = \mathrm{E}[match(p_i, m \in \mathcal{U})]$$

FIG. 4

$$p^* = \underset{i}{\operatorname{argmin}}\{ sel(p_i) \mid \langle l_i, p_i \rangle \in S \}$$

$$P_{r_S} = 1 - sel(p^*) \quad \leftarrow 500 / 502$$

FIG. 5

$$P_{rS}^j = P_{rS}^i * \left(1 - \alpha * \frac{|\overline{m_r}|}{10}\right)$$

FIG. 6

ENTITY STRUCTURED REPRESENTATION AND VARIANT GENERATION

FIELD

The present application generally relates to information technology, and, more particularly, to text-based entity identification techniques.

BACKGROUND

Named entities are atomic objects of reference and reasoning in many cognitive applications and knowledge-centric services such as, for example, question answering, text summarization and analytics. Fundamental to such knowledge-centric applications is the need to identify named entities from their textual mentions. However, a real-world entity may have a variety of representations. For example, consider the University of California, Santa Cruz, which can have different string representations or name variations such as UCSC, UC Santa Cruz, UC—Santa Cruz, etc. Accordingly, determining if two representations refer to the same entity is a challenging primitive in entity resolution and entity linking algorithms that drive such knowledge-centric applications.

SUMMARY

In one embodiment of the present invention, techniques for entity structured representation and variant generation are provided. An exemplary computer-implemented method can include automatically parsing instances of a given entity type into one or more semantic components, wherein said automatically parsing comprises implementing a parser based at least in part on (i) the given entity type and (ii) one or more items of information relevant to the given entity type. The method also includes generating, based at least in part on (i) the one or more semantic components and (ii) information pertaining to one or more valid component-specific variants, one or more variants of the one or more semantic components. Such a method also includes creating, based at least in part on the one or more variants of the one or more semantic components, one or more variants of at least one instance of an entity associated with the given entity type, and outputting, to at least one user, the one or more variants of the at least one instance of the entity.

In another embodiment of the invention, an exemplary computer-implemented method can include steps of generating, based at least in part on (i) the one or more semantic components and (ii) information pertaining to one or more valid component-specific variants, multiple variants of the one or more semantic components; outputting, to at least one user for user review, the multiple variants of the one or more semantic components; and creating, based at least in part on feedback from the user review of the multiple variants of the one or more semantic components, one or more variants of at least one instance of an entity associated with the given entity type.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a diagram illustrating a learning algorithm, according to an exemplary embodiment of the invention;

FIG. 3 is a diagram illustrating candidate selection equations, according to an exemplary embodiment of the invention;

FIG. 4 is a diagram illustrating a rule generation equation, according to an exemplary embodiment of the invention;

FIG. 5 is a diagram illustrating parsing equations, according to an exemplary embodiment of the invention;

FIG. 6 is a diagram illustrating a mapping rule reliability equation, according to an exemplary embodiment of the invention;

DETAILED DESCRIPTION

Figure 1:
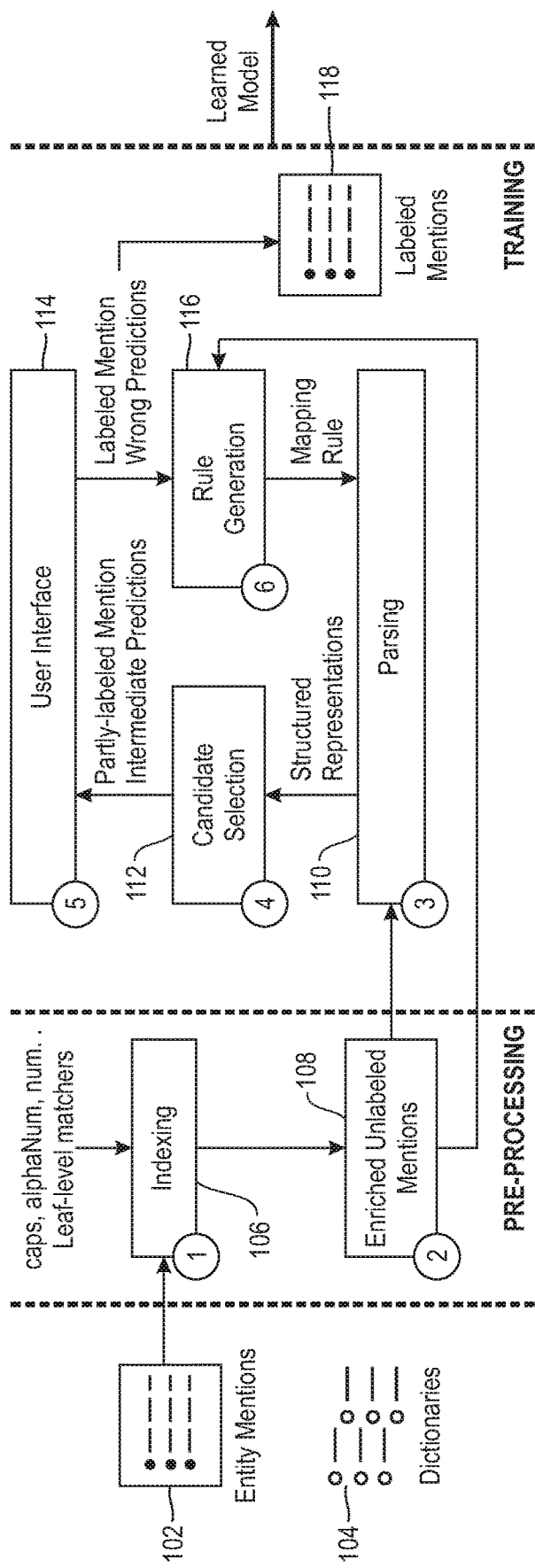
FIG. 1 is a diagram illustrating system architecture, according to an exemplary embodiment of the invention.

As described herein, an embodiment of the present invention includes entity structured representation and variant generation. As detailed herein, entities have underlying structures, commonly shared by entities of the same entity type, which can help reason over their name variations. Discovering, learning and manipulating these structures typically requires significant manual effort in the form of large amounts of labeled training data and handwritten transformation programs. However, one or more embodiments of the invention include generating and implementing an active-learning based framework that reduces the labeled data required to learn the structures of entities. Accordingly, programs for mapping entity mentions to their structures can be automatically generated using human-comprehensible labels.

In such embodiments, the active-learning based framework, also referred to herein as LUSTRE, learns structured representations for an entity type from human-comprehensible labels for a small set of mentions. The framework automatically synthesizes generalizable programs from the labels to map new mentions of the entity type to the learned structured representations. In addition, such a framework allows for an expert to incorporate domain knowledge and additional feedback to handle structural ambiguities.

Accordingly, via one or more embodiments of the invention, the active learning framework significantly reduces the manual effort required in labeling mentions and writing programs for structured representations. Also, such structured representations can help define similarity functions that benefit entity resolution, and string transformation functions that benefit relation extraction.

Given a set of unlabeled mentions (that is, raw strings) of a target entity type $\epsilon$, one or more embodiments of the invention include actively learning a high-quality model $M_\epsilon$ (with a small number of user labels) that can map a new mention of entity type $\epsilon$ to its structured representation. In carrying out such tasks, at least one embodiment of the invention can include identifying representative mentions that are structurally similar to several other mentions as well as identifying mentions with diverse structures. Such embodiments can also include, as further detailed herein, automatically inferring mapping programs from the user labels to reduce human effort, and handling ambiguities when an unlabeled mention has multiple candidate structured representations.

Mentions of a target entity type can have internal structured representations that include atomic semantic units. Given the labels for the semantic units for a small set of mentions, at least one embodiment of the invention includes learning a model M of mapping rules. Each mapping rule converts a raw string mention into a structured representation.

As used herein, a structured representation S of an entity mention is a sequence of atomic semantic units that compose its structure. Textually dissimilar mentions can have the same structure. Additionally, as used herein, a semantic unit is a tuple $u=<l:p>$, wherein l is a label for the unit and p is a pattern matching function (for example, a regular expression), referred to herein as a matcher. A matcher describes how a sub-string in a mention matches a semantic unit. Name variations of an entity can be explained as transformations on its semantic units.

Further, as used herein, the mapping rule $r_S$ for a structured representation S includes one or more matchers which decide how an unlabeled mention is mapped to S, resulting in a labeled entity mention. Specifically, a mapping rule $r_S$ includes a sequence of matchers in the semantic units in S, denoted by $r_S=\{p_i<l_i,p_i>\epsilon S\}$. This mapping rule constitutes a program that maps unseen mentions to S. Together, the various mapping rules constitute a model $M_\epsilon$ for the entity type $\epsilon$.

FIG. 1 is a diagram illustrating system architecture for LUSTRE, according to an embodiment of the invention, and FIG. 2 is a diagram illustrating a learning algorithm 200 implemented via LUSTRE, according to an exemplary embodiment of the invention. By way of illustration, FIG. 1 depicts input in the form of unlabeled mentions $U_\epsilon$ 102 and one or more dictionaries $D_\epsilon$ 104 of a target entity type $\epsilon$. The dictionaries 104 and a set of pre-defined matchers form the building blocks for the mapping rules. Before training, LUSTRE evaluates all of the matchers against $U_\epsilon$ 102 to inform the query strategy and rule generation.

As further described below, during training, in each iteration, LUSTRE selects a candidate mention for the user to label. Given the user-provided labels for semantic units of the selected mention, LUSTRE derives a generic mapping rule for the structure of the mention, updates the model M with the new rule and predicts the structures of unlabeled mentions. LUSTRE then presents a sample of these predictions to the user and integrates the user feedback into M. This iterative process can continue until all of the unlabeled mentions can be mapped to some structure, or the user is satisfied with M.

As illustrated in FIG. 1, an indexing component 106 utilizes user-provided dictionaries and pre-defined regular expressions to establish the vocabulary of matchers for the mapping rules. The dictionaries help capture key domain-specific terminology but need not correspond to semantic units. For example, a suffix dictionary can contain 'Inc.,' 'Corp.,' 'LLC,' 'Pvt. Ltd,' etc.

In a pre-processing step (Line 1 of Algorithm 200), the unlabeled mentions 102 are evaluated by the indexing component 106 against the matchers to generate enriched unlabeled mentions 108 (which are referenced again during training). Multiple matchers can match the same token. Also, it can be assumed that more specific matchers offer higher precision than generic matchers.

As further detailed herein, the query strategy to determine what constitutes an informative mention is central to the active-learning setting (as illustrated in Line 7 of Algorithm 200). One or more embodiments of the invention can include considering a mention informative if the mention represents the structure of several other unlabeled mentions and its current structure is unknown or uncertain. Such an embodiment can include adopting a unified approach, combining density-weighted sampling and uncertainty sampling, as such an approach is robust to outliers and input distribution.

Referring again to FIG. 1, for each unlabeled mention $m_i$ 108, at least one embodiment of the invention includes computing, via parsing component 110 (and as further detailed in connection with FIG. 3), a correlation score $c_i$ (based on its structural similarity to other mentions) and an uncertainty score $f_i$ (based on its predicted structure). Then, a utility score $u_i$ is computed for $m_i$, combining its correlation and uncertainty scores, and selecting a mention m* with the highest utility score for labeling.

To compute correlation score $c_i$, a metric is utilized to measure the similarity of the structures of two mentions. One or more embodiments of the invention include estimating structural similarity of two mentions as a function of the matchers that constitute their structures. Specifically, such an embodiment includes computing structural similarity $c(i,j)$ of a pair of mentions (i,j) as the edit distance of their structures, $S_i$ and $S_j$.

FIG. 3 is a diagram illustrating candidate selection equations 300, 302 and 304, according to an exemplary embodiment of the invention. In connection with candidate selection component 112 in FIG. 1, given the pair-wise structural similarity metric noted above, the correlation score $c_i$ of a mention $m_i$ is its average structural similarity to other unlabeled mentions. To estimate the uncertainty score $f_i$ of a mention, $P_{r_S}$, the reliability of the mapping rules that can parse the mention is used. If no mapping rule can parse a mention $m_i$, its structure is unknown (that is, $f_i$ is simply 1). Otherwise, $f_i$ is the uncertainty of the most reliable rule $\hat{r}_S$ known to parse the mention (via parsing component 110).

Figure 4:
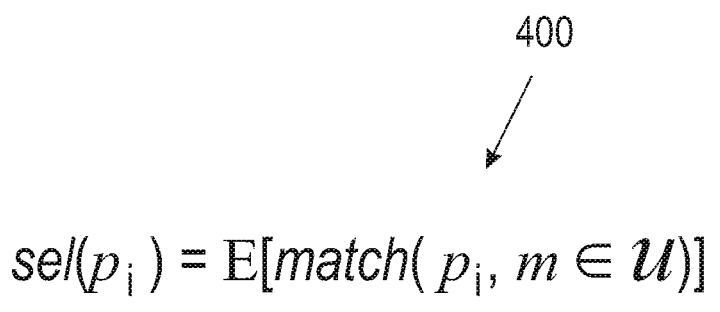

FIG. 4 is a diagram illustrating a rule generation equation 400, according to an exemplary embodiment of the invention. In the equation 400, match($p_i$, m) refers to the number of matches of $p_i$ over mention m. Referring again to FIG. 1, once the user labels, via user interface 114, a selected mention (selected via candidate selection component 112), LUSTRE synthesizes a generic program (that is, a mapping rule for the structure of the mention (illustrated in Line 15 of Algorithm 200)). Deriving a mapping rule is non-trivial, as semantic units in the structure can potentially span multiple tokens and matchers. Accordingly, one or more embodiments of the invention, via rule generation component 116, can include deriving a reliable rule as the sequence of most selective matchers, wherein selectivity is the expected number of matches of a matcher over the set of unlabeled mentions U 108.

FIG. 5 is a diagram illustrating parsing equations 500 and 502, according to an exemplary embodiment of the invention. When a new mapping rule is learned, at least one embodiment of the invention includes estimating its reliability in predicting structures of mentions, and updating the model M (as illustrated in Line 17-18 of Algorithm 200). These reliability scores can be used for estimating utility scores at candidate selection (via component 112) and for resolving ambiguities when multiple rules can parse a mention (with preference given to the most reliable rule). Following the intuition that generic rules are less reliable, one or more embodiments of the invention can include estimating reliability of a rule based on its expected numbers of matches in the unlabeled mentions. Specifically, as depicted in equation 502, reliability $P_{r_S}$ is a function of the selectivity of the matchers in $r_S$.

FIG. 6 is a diagram illustrating a mapping rule reliability equation 600, according to an exemplary embodiment of the invention. In equation 600, a represents the decay constant. Referring yet again to FIG. 1, LUSTRE uses an interface 114 to seek labels for a selected mention and additional feedback on intermediate predictions (as illustrated in Line 9 of Algorithm 200). To reduce the labeling effort, tokens in the mention that match an entry in the dictionary can be pre-labeled with the name of the dictionary (for example, 'IBM Corp' can be presented with 'Corp' labeled as a suffix). The user can keep these and/or provide new labels (for example, the user can label 'IBM' as a name) 118.

In addition, the interface 114 presents the predictions of structures for a sample of unlabeled mentions. In one or more embodiments of the invention, the user interface can select, for example, the ten least confident predictions based on uncertainty scores. The user can simply mark a prediction incorrect, without providing labels for its correct structure. Additionally, LUSTRE integrates this feedback to avoid over-estimating the reliability of learned rules, thereby improving the quality of model M Specifically, as depicted via equation 600, LUSTRE updates the reliability of a mapping rule $P_{r_S}^i$ as a function of the number of incorrect predictions $\overline{m}_r$ for the rule in the set of ten predictions presented to the user (as illustrated in Line 20 of Algorithm 200).

Figure 7:
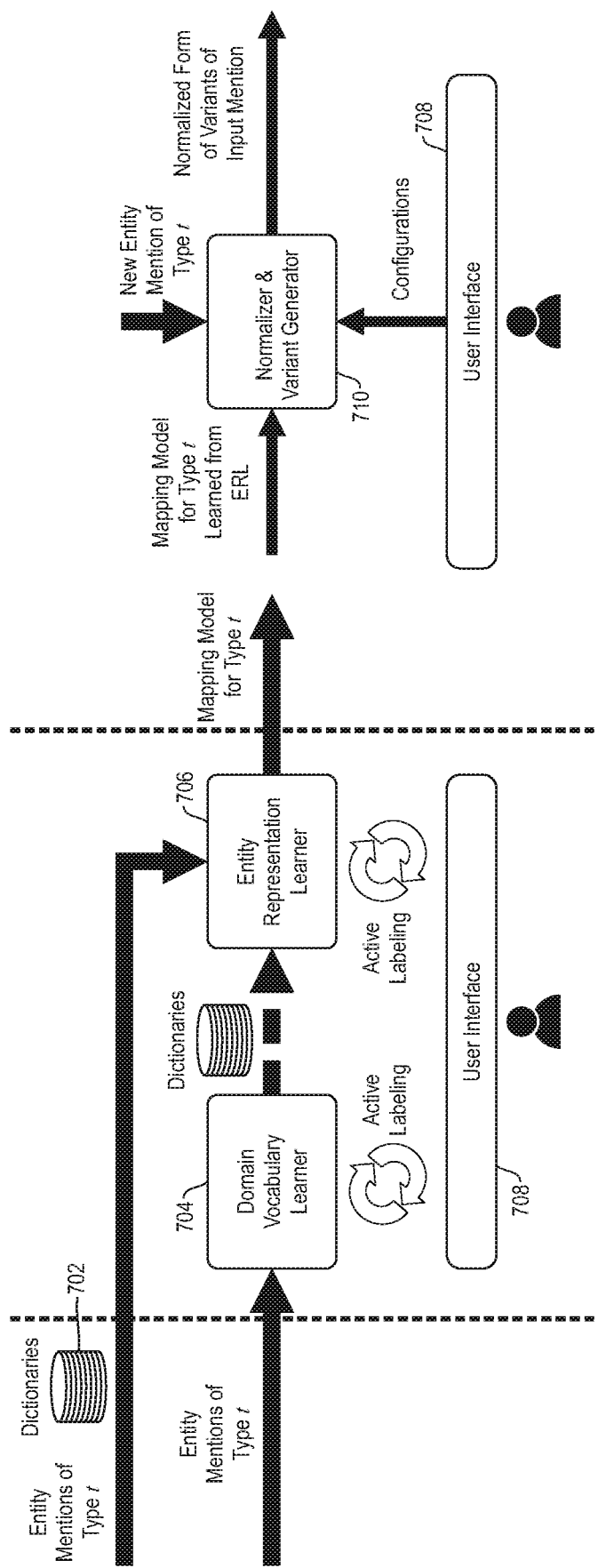
FIG. 7 is a diagram illustrating system architecture, according to an embodiment of the invention.

FIG. 7 is a diagram illustrating system architecture, according to an embodiment of the invention. By way of illustration, FIG. 7 depicts two phases of (1) learning structured representations and (2) synthesizing normalization and variant generation functions. Given a list of mentions of an entity type, the entity representation learner (ERL) 706 discovers structured representations iteratively. The output of ERL 706 is a mapping model that can be applied to other mentions with similar structured representations. As noted herein, the structured representation of a mention is a sequence of semantic units where each semantic unit has a label and a pattern matcher. In each iteration, the ERL 706 selects a mention and asks the user, via user interface 708, to provide labels for the mention's semantic units. The ERL 706 can infer the matchers for the units and generate a mapping program using these matchers.

One or more embodiments of the invention can include using two types of pattern matchers for the semantic units: built-in regex-based matchers and custom dictionary-based matchers. Dictionary-based matchers, based on dictionaries 702, can be provided by the user or learner 706 using a domain vocabulary learner (DVL) 704. Once the structured representations are learned, the user can, via user interface 708, use LUSTRE to declaratively define transformations over these structured representations to synthesize programs for normalization and variant generation via component 710. The synthesized programs and mapping model can then be packaged as application programming interfaces (APIs) for one or more downstream applications.

In one or more embodiments of the invention, the user can provide a set of unlabeled mentions of an entity type of interest. In such an embodiment, domain vocabulary learner 704 and entity representation learner 706 follow a similar iterative learning process, wherein a mention is selected for the user to label in each iteration. The user provides, via user interface 708, labels for the tokens in the selected mention, such as a concept name for a dictionary or a label for a semantic unit. Both the learners (704 and 706) also allow the user to provide feedback on their intermediate predictions. This interaction model reduces the number of mentions that the user has to label and hides the complexities of the underlying learning process. Additionally, such an embodiment can include providing an expressive, declarative framework for generating programs for normalization and variant generation (via component 710), wherein the user only has to configure a set of generic transformations over the learned structured representations.

As detailed herein, at least one embodiment of the invention includes learning a set of programs that map entity mentions to their structured representations. Each program has a mapping strategy, including a set of matchers, which determines how a mention is mapped to the semantic units of a representation.

Additionally, LUSTRE can include, for example, pre-defined generic regular expression matchers that capture a token with: (1) uppercase alphabetic characters, (2) lowercase alphabetic characters, (3) a mixture of uppercase and lowercase alphabetic characters, (4) numeric digits, (5) alphabetic and numeric characters, and/or (6) special non-word characters. Additionally, LUSTRE can use a set of dictionary-based matchers, which can include a dictionary of words or phrases for a domain-specific concept. As noted, a user can learn such dictionaries using the domain vocabulary learner 704, and one or more embodiments of the invention can include learning how to combine the different matchers for complex semantic units in the structured representations.

To reduce both the skill and effort required in the learning process, LUSTRE hides the details on how the mentions are selected for the user to label, as well as how the learned model generalizes to unseen mentions. In at least one embodiment of the invention, the user only has to provide human-comprehensible labels for a small number of mentions and, optionally, feedback on one or more intermediate predictions, using a web-based interface.

Referring again to FIG. 7, to learn dictionaries 702 for an entity type, the user can provide a list of mentions to the DVL 704. Textually similar mentions are grouped by DVL using hierarchical clustering, and DVL uses an active learning based algorithm, wherein representative mentions are selected from one of the clusters in each iteration and the user is asked (via user interface 708) to label the representative mentions. From the user labels, DVL 704 can identify a set of preliminary, incomplete dictionaries and incrementally complete these dictionaries in the subsequent iterations.

This iterative process can continue until all of the mentions are processed and/or the user is satisfied with the dictionaries.

As depicted in FIG. 7, user-interface 708 is implemented for providing labels for concepts in the selected mention. By way merely of example, the user can click to select one or more tokens in the selected mention, and for the selected token(s), the user can provide a new custom label or select an existing label. It is not required for the user to label every token in the mention. The DVL 704 can ultimately derive a generic extraction rule that is consistent with the user labels. For instance, the DVL 704 can derive a rule "<CapitalWord\<CapitalWord>, [2]→SUFFIX" that extracts the second token as SUFFIX in a two-token substring, wherein both tokens have capital words. To extract more dictionary entries for the concept SUFFIX, for example, DVL 704 applies this extraction rule to other mentions in the selected cluster.

Additionally, DVL 704 can present the most uncertain predictions to the user (via user interface 708) for verification. In an example embodiment, the user only has to uncheck the check-boxes corresponding to incorrect predictions, and this feedback can be used as labeled data for the extraction rule. In a subsequent generalization step, DVL 704 applies the extraction rule to the entire dataset, identifies more dictionary entries, and seeks user labels on the uncertain predictions. Once the dictionaries are learned, the user can view and edit the dictionaries before using them for learning structured representations.

Given a list of mentions of an entity type, the ERL 706 learns the structured representations as a function of dictionary-based and/or regular expression-based matchers. Specifically, the ERL 706 learns how to combine these matchers to constitute the semantic units in a representation such that the semantic units are consistent with the labels provided by the user. Like DVL 704, ERL 706 uses an active learning algorithm to iteratively select candidate mentions for labeling. ERL 706 selects a mention such that its structured representation is different from those of previously-labeled mentions so that different representations can be learned quickly with minimal user effort.

ERL 706 uses interface 708 for labeling as DVL, though ERL 706 expects the user to label all key semantic units in a mention. However, to make the task easier, ERL 706 shows the labels for the semantic units that could be inferred from the dictionaries. Once it obtains the labels, ERL 706 selects a mapping strategy from multiple possible sequences of matchers that are consistent with the user labels, and subsequently generates a program for the strategy and updates its model of programs.

Because the programs learned can be generic, ERL 706 allows the user to control the quality of the model learned by providing additional feedback on one or more intermediate, uncertain predictions. In at least one embodiment of the invention, the user, via interface 708, only has to mark the intermediate, uncertain predictions as correct or incorrect. This feedback can be used internally to reason how multiple mapping strategies can be used for a mention. Further, this iterative process can continue until all of the mentions can be mapped to the learned representations and/or the user is satisfied with the quality of the model learned.

As also depicted in FIG. 7, LUSTRE allows users, via user interface 708, to configure their normalization and variant generation functions over the structured representations learned from the mentions. Specifically, LUSTRE provides a set of transformation operators that the user can configure to manipulate the semantic units of an unseen mention. These transformed semantic units are then used to compose meaningful variations of entities. As noted, LUSTRE provides interface 708 to configure four types of transformation operators:

(i) INITIAL: Retains the first character of each token in the token sequence of a semantic unit. The user can also specify whether a dot should be added to each initial character.

(ii) ORDER: Defines a specific order for the semantic units.

(iii) DROP: Ignores token sequence of a semantic unit.

(iv) MAP: Replaces one or more token sequences of a semantic unit with a user-provided string.

Accordingly, LUSTRE allows a user to define multiple configurations for different tasks. Optionally, the user can add custom units for special characters (such as, for example, "/" for separating month, day, and year in date mentions). By reordering (via a drag-and-drop mechanism, for example) and/or deleting semantic units, the user can generate different configuration patterns. The user can configure the normalization and variant generation functions independently, and the configuration for variant generation allows all of the transformation operators such that all possible variations with transformed semantic units can be generated.

However, in one or more embodiments of the invention, only some dynamically-determined set of operators is used for normalization, as all mentions have to be normalized to a unique representation. At run-time, these configured functions are applied to the structured representation of a mention. LUSTRE also allows the user to test-run and adjust the configuration interactively before exporting the corresponding programs for their applications.

Figure 8:
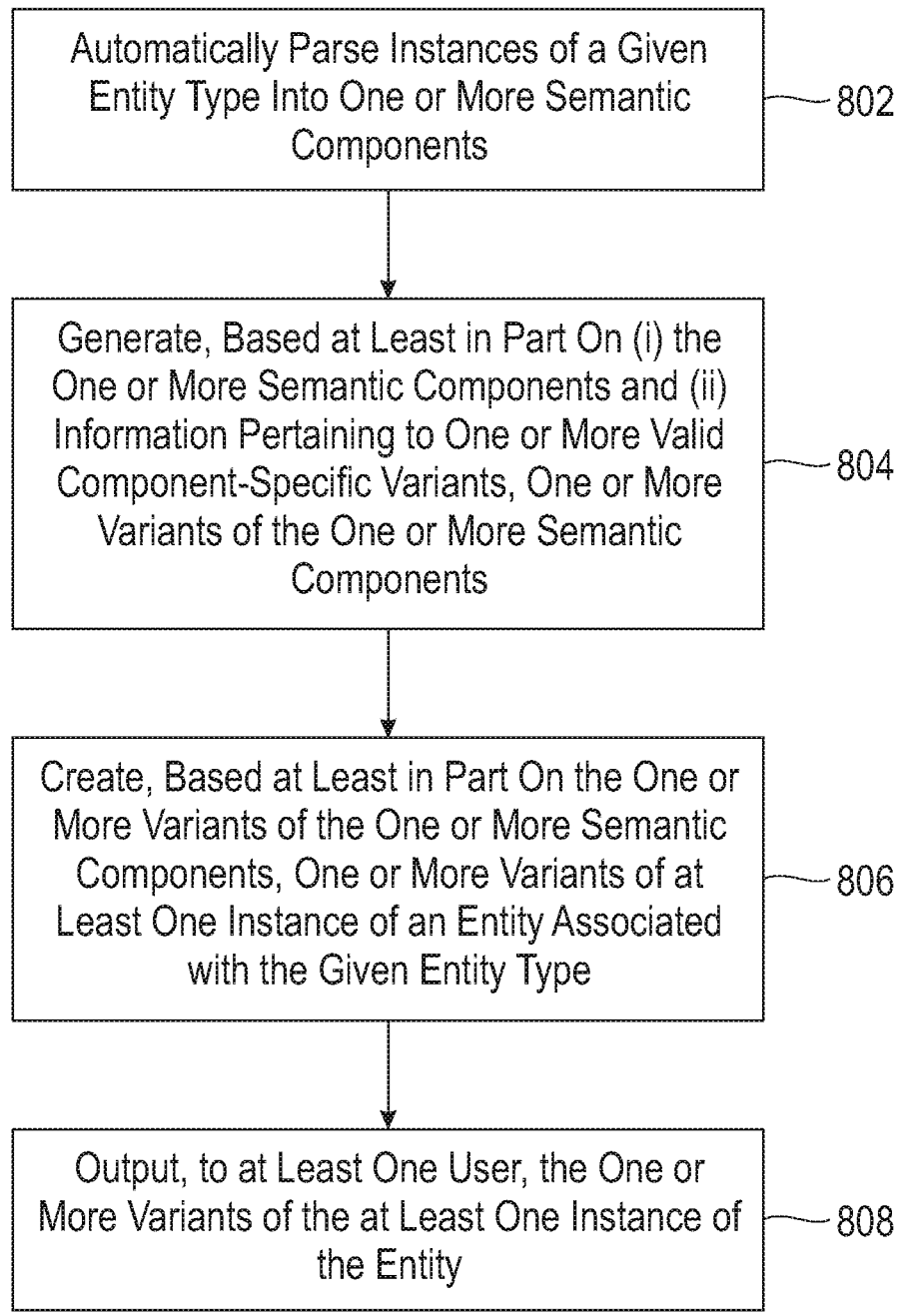
FIG. 8 is a flow diagram illustrating techniques according to an embodiment of the invention.

FIG. 8 is a flow diagram illustrating techniques according to an embodiment of the present invention. Step 802 includes automatically parsing instances of a given entity type into one or more semantic components, wherein automatically parsing comprises implementing a parser based at least in part on (i) the given entity type and (ii) one or more items of information relevant to the given entity type. As used herein, a parser refers to a computer program that parses an input string into one or more structured representations. Additionally, at least one embodiment of the invention can include generating the parser using (i) a set of instances of the given entity type labeled with the one or more semantic components and (ii) a set of unlabeled instances of the given entity type.

Step 804 includes generating, based at least in part on (i) the one or more semantic components and (ii) information pertaining to one or more valid component-specific variants, one or more variants of the one or more semantic components. The information pertaining to one or more valid component-specific variants can include user-provided information.

Step 806 includes creating, based at least in part on the one or more variants of the one or more semantic components, one or more variants of at least one instance of an entity associated with the given entity type. Step 808 includes outputting, to at least one user, the one or more variants of the at least one instance of the entity.

The techniques depicted in FIG. 8 can also include generating the parser such that the parser maps (i) the information pertaining to one or more valid component-specific variants of a particular instance of an entity to (ii) one or more structural aspects of the particular instance of an entity. Further, one or more embodiments of the invention can include generating a model based at least in part on the one or more generated mapping rules, predicting, using the generated model, one or more structural aspects of one or more unlabeled instances of the entity, and outputting, to a user for review, the predicted structural aspects of the one or more unlabeled instances. Additionally, such an embodiment includes integrating feedback from the user, in response to the review of the predicted structural aspects of the one or more unlabeled instances, into the model.

Also, an additional embodiment of the invention includes generating, based at least in part on (i) the one or more semantic components and (ii) information pertaining to one or more valid component-specific variants, multiple variants of the one or more semantic components; outputting, to at least one user for user review, the multiple variants of the one or more semantic components; and creating, based at least in part on feedback from the user review of the multiple variants of the one or more semantic components, one or more variants of at least one instance of an entity associated with the given entity type.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
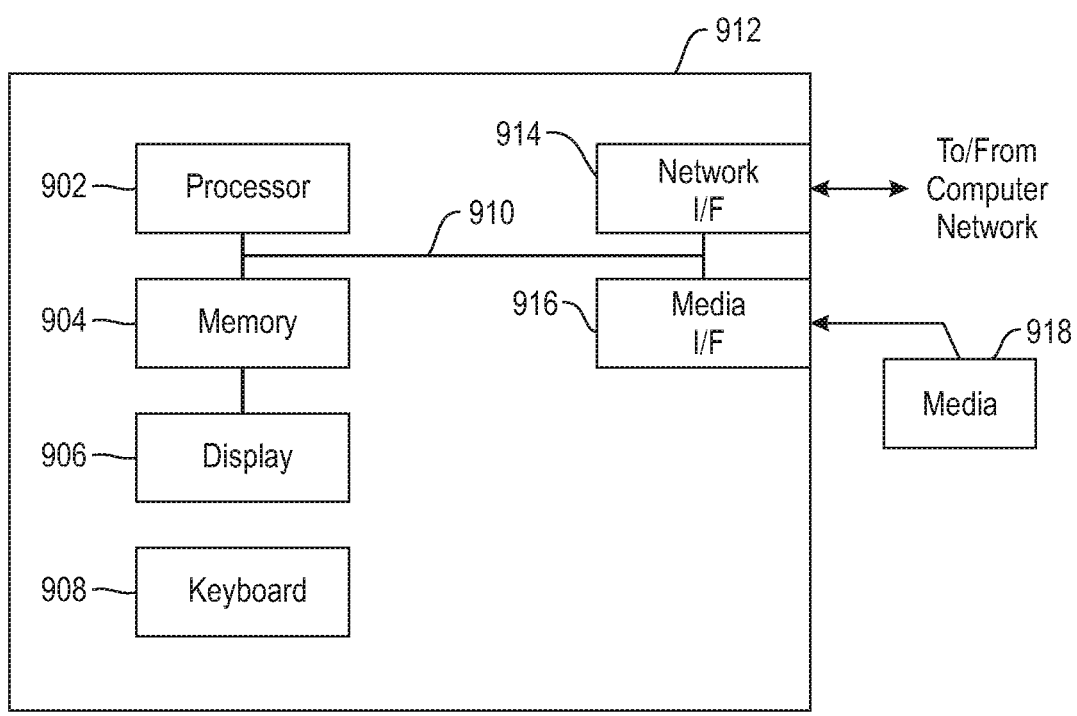
FIG. 9 is a system diagram of an exemplary computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
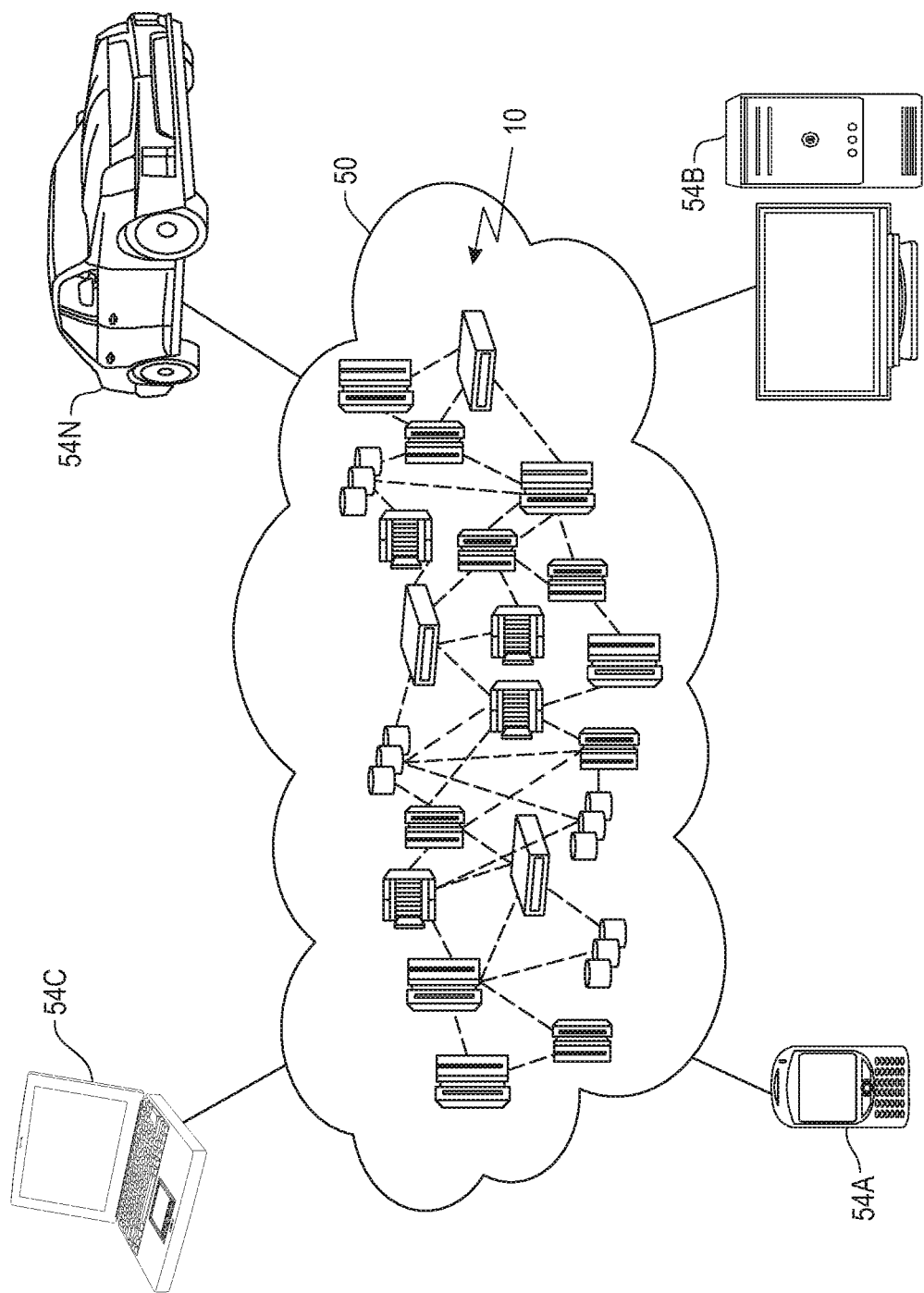
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
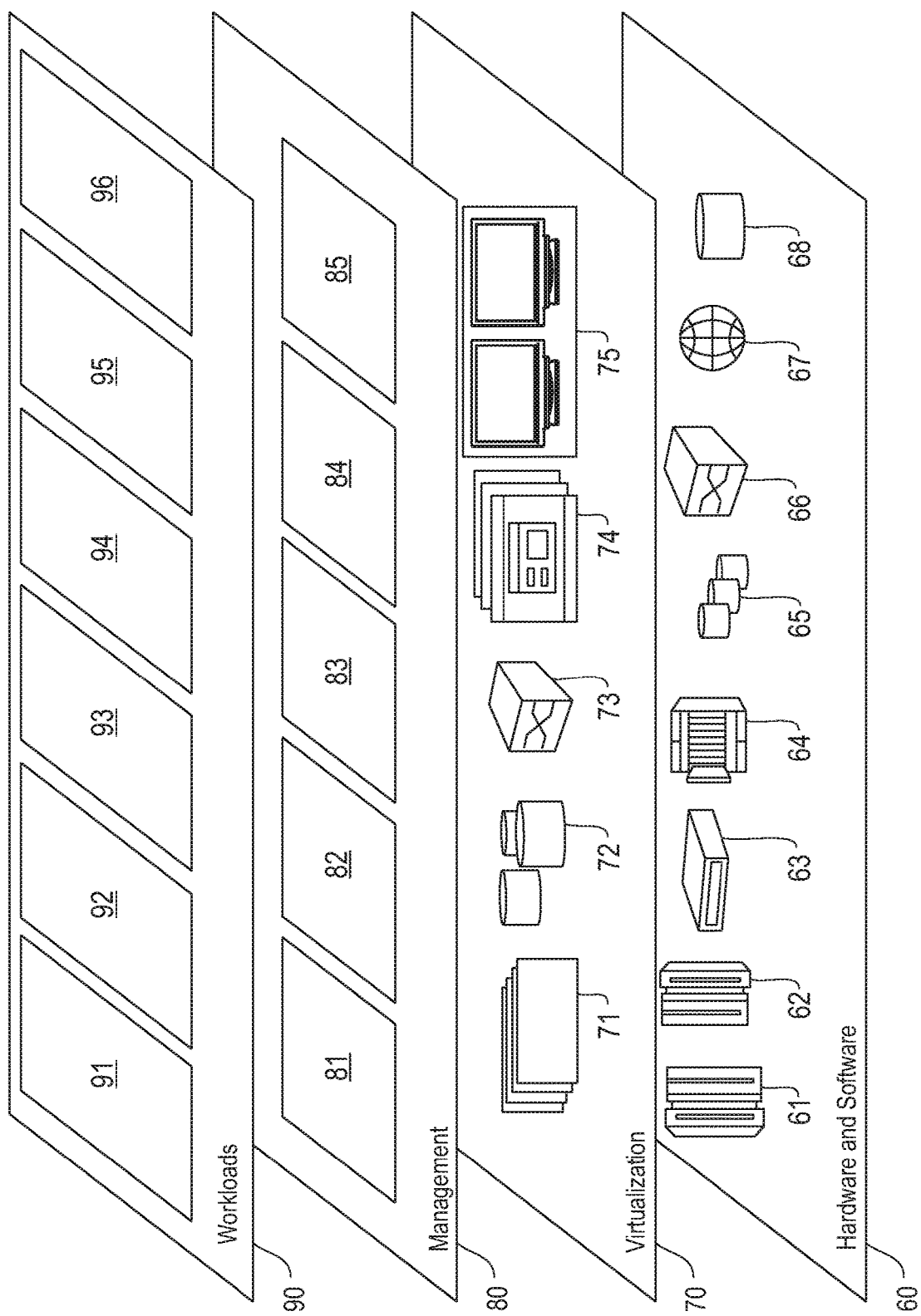
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and active learning entity representation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, reducing the labeled data required to learn the structures of entities by automatically generating programs for mapping entity mentions to their structures using human-comprehensible labels The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    automatically generating an active learning-based parser by (i) learning one or more semantic components attributed to a first set of labeled instances of a given entity type and (ii) mapping a second set of unlabeled instances of the given entity type to at least one of the one or more semantic components;
    automatically parsing, from input text, at least a portion of a third set of unlabeled instances of the given entity type into at least one of the one or more semantic components, wherein said automatically parsing comprises implementing the active learning-based parser based at least in part on one or more items of information relevant to the given entity type;
    generating, based at least in part on (i) the one or more semantic components and (ii) information pertaining to one or more valid component-specific variants, one or more variants of the one or more semantic components;
    creating, based at least in part on the one or more variants of the one or more semantic components, one or more variants of at least one instance of an entity associated with the given entity type in the input text; and
    outputting, to at least one user, the one or more variants of the at least one instance of the entity;
    wherein the method is carried out by at least one computing device.

2. The computer-implemented method of claim 1, wherein the information pertaining to one or more valid component-specific variants comprises user-provided information.

3. The computer-implemented method of claim 1, comprising:
    generating the active learning-based parser such that the active learning-based parser maps (i) the information pertaining to one or more valid component-specific variants of a particular instance of an entity to (ii) one or more structural aspects of the particular instance of an entity.

4. The computer-implemented method of claim 1, comprising:
    predicting one or more structural aspects of one or more unlabeled instances of the entity.

5. The computer-implemented method of claim 4, comprising:
    outputting, to a user for review, the predicted structural aspects of the one or more unlabeled instances.

6. The computer-implemented method of claim 5, comprising:
    integrating feedback from the user, in response to the review of the predicted structural aspects of the one or more unlabeled instances, into the model.

7. A computer program product comprising a computer readable storage medium having program instructions embodied therewith, the program instructions executable by a computing device to cause the computing device to:
    automatically generate an active learning-based parser by (i) learning one or more semantic components attributed to a first set of labeled instances of a given entity type and (ii) mapping a second set of unlabeled instances of the given entity type to at least one of the one or more semantic components;
    automatically parse, from input text, at least a portion of a third set of unlabeled instances of the given entity type into at least one of the one or more semantic components, wherein said automatically parsing comprises implementing the active learning-based parser based at least in part on one or more items of information relevant to the given entity type;

generate, based at least in part on (i) the one or more semantic components and (ii) information pertaining to one or more valid component-specific variants, one or more variants of the one or more semantic components;

create, based at least in part on the one or more variants of the one or more semantic components, one or more variants of at least one instance of an entity associated with the given entity type in the input text; and output, to at least one user, the one or more variants of the at least one instance of the entity.

8. The computer program product of claim 7, wherein the information pertaining to one or more valid component-specific variants comprises user-provided information.

9. The computer program product of claim 7, wherein the program instructions executable by a computing device further cause the computing device to:

generate the active learning-based parser such that the active learning-based parser maps (i) the information pertaining to one or more valid component-specific variants of a particular instance of an entity to (ii) one or more structural aspects of the particular instance of an entity.

10. The computer program product of claim 7, wherein the program instructions executable by a computing device further cause the computing device to:

predict one or more structural aspects of one or more unlabeled instances of the entity.

11. The computer program product of claim 10, wherein the program instructions executable by a computing device further cause the computing device to:

output, to a user for review, the predicted structural aspects of the one or more unlabeled instances.

12. The computer program product of claim 11, wherein the program instructions executable by a computing device further cause the computing device to:

integrate feedback from the user, in response to the review of the predicted structural aspects of the one or more unlabeled instances, into the model.

13. A system comprising:

a memory; and at least one processor operably coupled to the memory and configured for:

automatically generating an active learning-based parser by (i) learning one or more semantic components attributed to a first set of labeled instances of a given entity type and (ii) mapping a second set of unlabeled instances of the given entity type to at least one of the one or more semantic components;

automatically parsing, from input text, at least a portion of a third set of unlabeled instances of the given entity type into at least one of the one or more semantic components, wherein said automatically parsing comprises implementing the active learning-based parser based at least in part on one or more items of information relevant to the given entity type;

generating, based at least in part on (i) the one or more semantic components and (ii) information pertaining to one or more valid component-specific variants, one or more variants of the one or more semantic components;

creating, based at least in part on the one or more variants of the one or more semantic components, one or more variants of at least one instance of an entity associated with the given entity type in the input text; and outputting, to at least one user, the one or more variants of the at least one instance of the entity.

14. A computer-implemented method comprising:

automatically generating an active learning-based parser by (i) learning one or more semantic components attributed to a first set of labeled instances of a given entity type and (ii) mapping a second set of unlabeled instances of the given entity type to at least one of the one or more semantic components;

automatically parsing, from input text, at least a portion of a third set of unlabeled instances of the given entity type into at least one of the one or more semantic components by implementing the active learning-based parser based at least in part on one or more items of information relevant to the given entity type;

generating, based at least in part on (i) the one or more semantic components and (ii) information pertaining to one or more valid component-specific variants, multiple variants of the one or more semantic components;

outputting, to at least one user for user review, the multiple variants of the one or more semantic components;

creating, based at least in part on feedback from the user review of the multiple variants of the one or more semantic components, one or more variants of at least one instance of an entity associated with the given entity type in the input text; and outputting, to the at least one user, the one or more variants of the at least one instance of the entity;

wherein the method is carried out by at least one computing device.

15. The computer-implemented method of claim 14, wherein the information pertaining to one or more valid component-specific variants comprises user-provided information.

16. The computer-implemented method of claim 14, comprising:

generating the active learning-based parser such that the active learning-based parser maps (i) the information pertaining to one or more valid component-specific variants of a particular instance of an entity to (ii) one or more structural aspects of the particular instance of an entity.

* * * * *